United States Patent
Rain et al.

(10) Patent No.: US 10,146,310 B2
(45) Date of Patent: Dec. 4, 2018

(54) HAPTIC USER INTERFACE CONTROL

(71) Applicant: Intel Corporation, Santa Clara, CA (US)

(72) Inventors: Guy Rain, Yad Natan (IL); Ohad Zur, Modiin (IL); Dor Levy, Jerusalem (IL); Ofir Natan, En Yaakov (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/670,113

(22) Filed: Mar. 26, 2015

(65) Prior Publication Data

US 2016/0282942 A1 Sep. 29, 2016

(51) Int. Cl.
| | |
|---|---|
| *G06F 3/01* | (2006.01) |
| *G06F 1/16* | (2006.01) |
| *A63F 13/24* | (2014.01) |
| *A63F 13/803* | (2014.01) |
| *A63F 13/245* | (2014.01) |
| *A63F 13/212* | (2014.01) |
| *A63F 13/285* | (2014.01) |

(52) U.S. Cl.
CPC ............ *G06F 3/016* (2013.01); *A63F 13/212* (2014.09); *A63F 13/24* (2014.09); *A63F 13/245* (2014.09); *A63F 13/285* (2014.09); *A63F 13/803* (2014.09); *G06F 1/163* (2013.01); *G06F 3/014* (2013.01); *G06F 2203/013* (2013.01)

(58) Field of Classification Search
CPC .......... G06F 3/011; G06F 3/014; G06F 3/016; G06T 17/00
See application file for complete search history.

(56) References Cited

U.S. PATENT DOCUMENTS

| | | | |
|---|---|---|---|
| 2002/0021277 A1* | 2/2002 | Kramer ................... | G06F 3/016 345/156 |
| 2003/0120399 A1* | 6/2003 | Yamamoto ........... | G05D 1/0077 701/4 |
| 2008/0055248 A1 | 3/2008 | Tremblay et al. | |
| 2009/0153365 A1 | 6/2009 | Salsedo et al. | |
| 2010/0127999 A1 | 5/2010 | Kim et al. | |
| 2010/0302015 A1* | 12/2010 | Kipman ................. | A63F 13/06 340/407.1 |
| 2012/0182135 A1* | 7/2012 | Kusuura ................... | G06F 3/00 340/407.1 |
| 2013/0044049 A1* | 2/2013 | Biggs ..................... | G06F 3/016 345/156 |

(Continued)

FOREIGN PATENT DOCUMENTS

EP   1006484 A2   6/2000

OTHER PUBLICATIONS

Steven Ashley, "Artificial Muscles," Scientific American, Oct. 2003, 8 pages.

(Continued)

*Primary Examiner* — Chun-Nan Lin
(74) *Attorney, Agent, or Firm* — Jordan IP Law, LLC (57) ABSTRACT

Systems, apparatuses, and methods may include generating a three-dimensional model based on a two-dimensional image, determining one or more material characteristics of the haptic user interface, and triggering a change in the one or more material characteristics to create a three-dimensional haptic representation of at least a portion of the two-dimensional image.

13 Claims, 7 Drawing Sheets

| SW State/position | Voltage | Flexer's Angle |
|---|---|---|
| 1 (Max tension) | 0.8 | ⌒ |
| 2 | 0.6 | ⌒ |
| 3 | 0.4 | ⌒ |
| 4 | 0.2 | ⌒ |
| 5 (Fully flexible) | 0 | ⎯ |

(56) References Cited

U.S. PATENT DOCUMENTS

| | | | |
|---|---|---|---|
| 2013/0127759 A1* | 5/2013 | Bae | G06F 3/041 345/173 |
| 2013/0215079 A1 | 8/2013 | Johnson et al. | |
| 2014/0176415 A1* | 6/2014 | Buuck | G06F 3/016 345/156 |
| 2016/0147304 A1* | 5/2016 | Lund | G06F 3/016 715/702 |
| 2016/0162022 A1* | 6/2016 | Seth | G06F 3/017 345/156 |

OTHER PUBLICATIONS

Danfoss, "DEAP technology is a platform technology as fundamental as electro-magnetic solenoid, piezo ceramics etc.," (downloaded from the Wayback Machine on Mar. 21, 2015 <www.polypower.com/Technology/Overview/>), 1 page.

Endo et al., "Virtual Grasping Assessment Using 3D Digital Hand Model," Annual Applied Ergonomics Conference: Celebrating the Past-Shaping the Future, 2007, 21 pages.

Haus et al., "Electroactive Polymers," Technische Universitat Darmstadt, retrieved Mar. 21, 2015, 2 pages.

Gregory T. Huang, "Electroactive Polymers: Artifical muscles made of electroactive polymers impart lifelike movements to biomedical and robotic devices," MIT Technology Review <www.technologyreview.com/article/401750/electroactive-polymers/>, Dec. 1, 2002, 4 pages.

Lucy Ingham, "Turning Sketches into 3D Models with the Click of a Button," Factor Digital Magazine, Aug. 14, 2014, 3 pages.

Walt Kester et al., "Chapter 2: Fundamentals of Sampled Data Systems," Analog-Digital Conversion, 2005,120 pages, Analog Devices, Inc <http://www.analog.com/library/analogDialogue/archives/39-06/data_conversion_handbook.html>.

Reza Moghimi, "Seven Steps to Successful Analog-to-Digital Signal Conversion (Noise Calculation for Proper Signal Conditioning)," Technical Article MS-2022, May 2011, 5 pages, Analog Devices, Inc.

Wikipedia, "Digital-to-analog converter," Wikipedia.org, retrieved Mar. 21, 2015, 8 pages.

Wikipedia, "Electroactive polymers," Wikipedia.org, retrieved Mar. 21, 2015, 11 pages.

Wikipedia, "Match moving," Wikipedia.org, retrieved Mar. 21, 2015, 8 pages.

International Search Report and Written Opinion for International Patent Application No. PCT/US2016/016778, dated May 13, 2016, 13 pages.

International Preliminary Report on Patentability for International Patent Application No. PCT/2016/016778, dated Oct. 5, 2017, 10 pages.

* cited by examiner

| SW State/position | Voltage | Flexer's Angle |
|---|---|---|
| 1 (Max tension) | 0.8 |  |
| 2 | 0.6 |  |
| 3 | 0.4 |  |
| 4 | 0.2 |  |
| 5 (Fully flexible) | 0 |  |

HAPTIC USER INTERFACE CONTROL

TECHNICAL FIELD

Embodiments generally relate to haptic user interfaces. More particularly, embodiments relate to methods, apparatuses, and systems that control haptic user interfaces.

BACKGROUND

Currently many visual objects may be presented on user interfaces in a variety of environments (for example, augmented reality, computer games, interactive displays, etc.). Although the objects can be seen, there may be limited and/or unrealistic physical feedback from the objects being viewed.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
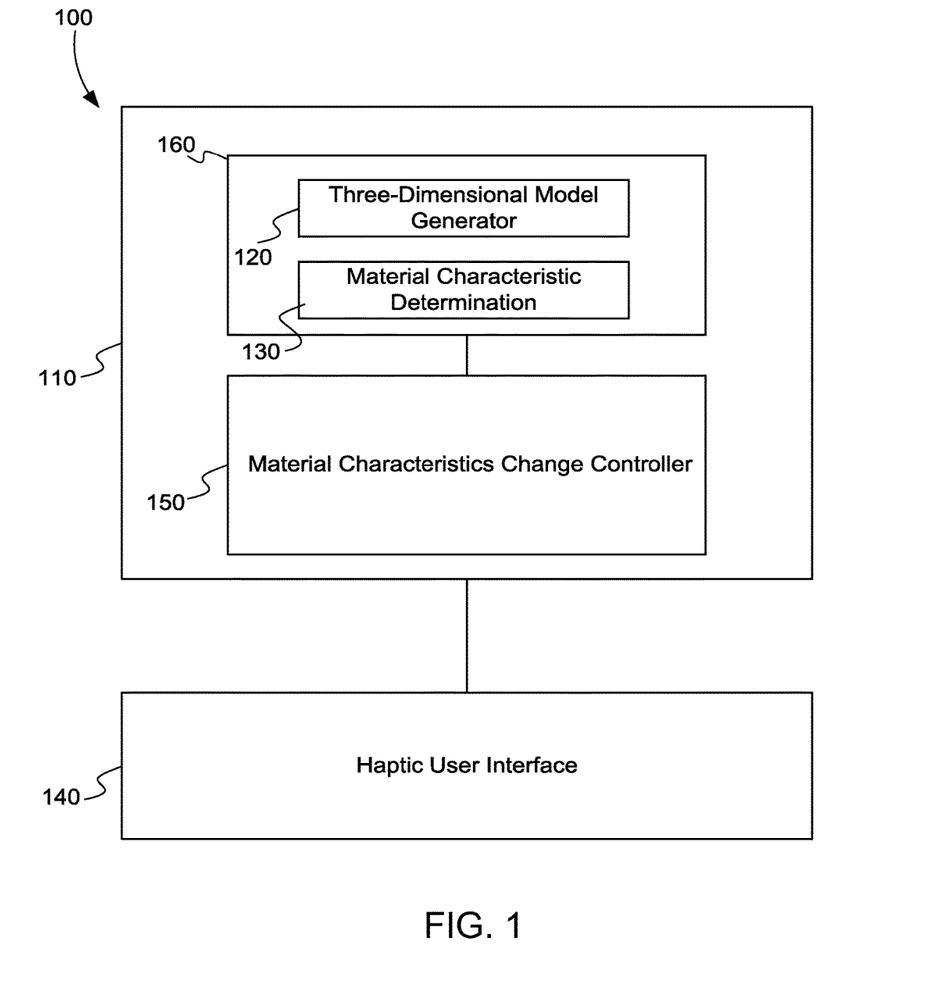
FIG. 1 is a block diagram of an example of a system including a haptic user interface management apparatus according to an embodiment.

Turning now to FIG. 1, the haptic user interface system 100 includes logic, implemented at least partly in configurable or fixed-functionality hardware 110, having a processor 160 with a three-dimensional (3D) model generator 120 to generate a three-dimensional model based on a two-dimensional image, a material characteristic determination component 130 to determine one or more material characteristics of a haptic user interface 140, and a material characteristics change controller 150 (e.g., digital to analog controller) to trigger a change in the one or more material characteristics to create a three-dimensional haptic representation of at least a portion of the two-dimensional image. The illustrated hardware 110 communicates with the haptic user interface 140.

As used herein, the expression "haptic user interface" may relate to any type of user interface that provides a tactile sensation to the user. Examples of haptic user interfaces may include wearable devices such as gloves, vests, and footwear, and surfaces such as touchpads. For example, the illustrated haptic user interface 140 may include a variety of materials having characteristics that are changeable through the application of an external stimulus such as an electric current or voltage. Such materials may include electroactive polymers, ionic polymer-metal composites, piezoelectric materials, microfluidic materials, electrostatic materials, and so forth. Typically, these materials change a dimension in response to an external stimulus or trigger or are actuated by an external stimulus such as microfluidic actuators.

Figure 2:
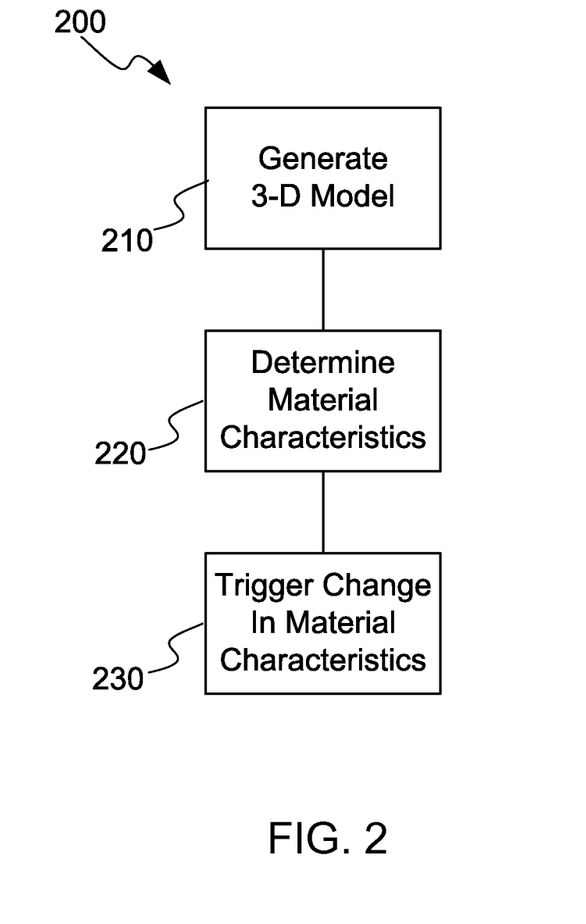
FIG. 2 is a flowchart of an example of a method of operating a haptic user interface management apparatus according to an embodiment.
Figure 3A:
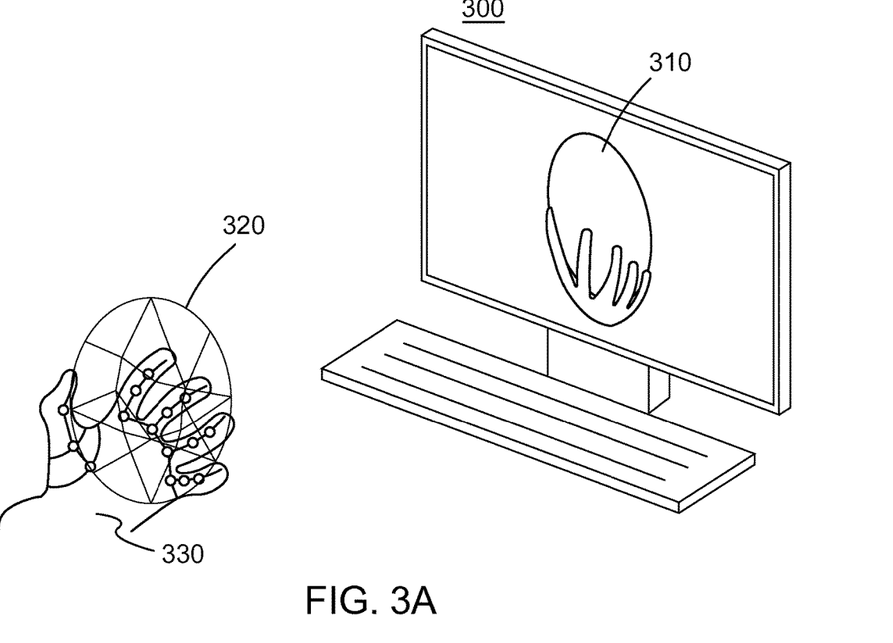
FIG. 3A is a schematic diagram of an example of a system including a haptic user interface according to an embodiment.

In use, the system 100 of FIG. 1 may perform a method 200 depicted in FIG. 2. With continuing reference to FIGS. 2 and 3A, the method 200 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. At illustrated block 210, the logic generates a three-dimensional model from a two-dimensional image. In one aspect, the logic may generate the three-dimensional model by forming imaginary contour lines along surfaces as depicted at element 320 in FIG. 3A from a two-dimensional image, element 310 in FIG. 3A. From these contour lines, equations may be generated that create a mathematical model of a three-dimensional surface presented by the two-dimensional image 310.

To create the appropriate tactile response to a user, the portion of a surface to be represented at the haptic user interface, illustrated as a glove 330 in FIG. 3A, has its material characteristics determined at illustrated block 220. For example, in the glove 330 there are plural segments that correspond to various portions of a user hand such as fingers, palm, thumb, etc. From the two-dimensional image 310, a hand is indicated as holding a spherical object on a lower portion of the object. The three-dimensional model may approximate the portion of the surface being contacted in block 210 while at block 220 the various segments of the glove have each segment shape determined and the material characteristics to obtain the desired shape are defined. For an electroactive polymer used in the haptic user interface, such material characteristics may include a voltage or current to be applied to the electroactive polymer to achieve the desired shape in order to provide the tactile impression of holding the spherical object depicted in the two-dimensional image 310.

Figure 3B:
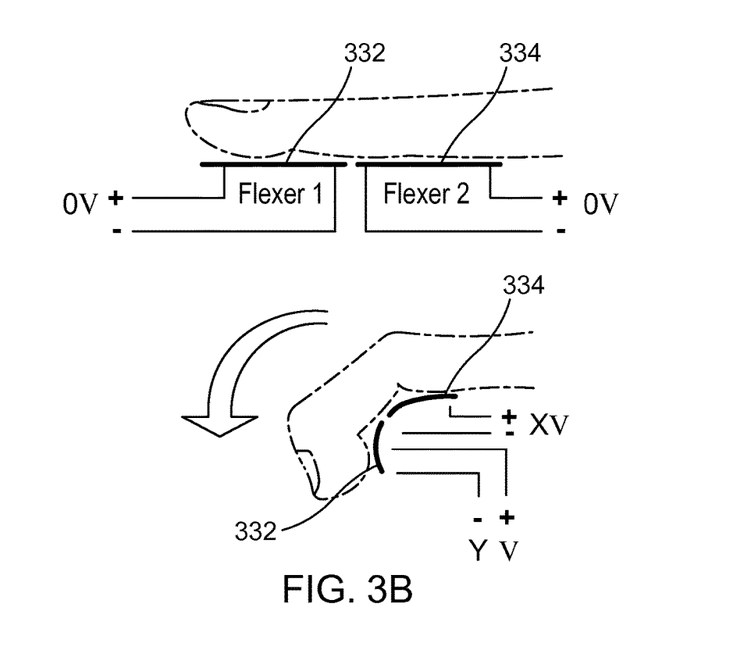
FIG. 3B is an enlarged portion of the haptic user interface of FIG. 3A.
Figure 5:
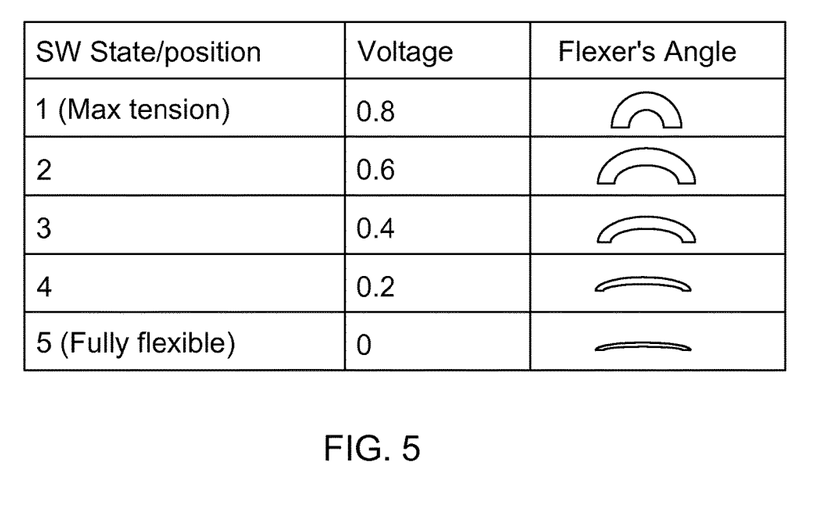
FIG. 5 is a table showing the shape of an electroactive polymer material for an applied voltage according to an embodiment.

In illustrated block 230, the material characteristics determined in illustrated block 220 are changed. For example, for an electroactive polymer, a suitable voltage might be applied to each segment of the haptic interface glove 330 of FIG. 3A to cause a bending of each segment to an extent that a three-dimensional haptic representation of at least a portion of the two-dimensional image 310 is provided to a user. In an embodiment, the function of block 230 may be performed by a digital to analog (D/A) controller such as the controller 150 (FIG. 1), already discussed. For an exemplary electroactive polymer, a table is depicted in FIG. 5 that shows a degree of flexure or rigidity of the material in response to various applied voltages. For example, the material is in a relaxed, unbent state when 0 volts are applied. This relaxed state is depicted for two segments of the haptic user interface glove 330, flexor 1, element 332, and flexor 2, element 334 in FIG. 3B. For an applied voltage of 0.8 volts, the electroactive polymer reaches its maximum state of bending deformation. Intermediate voltages produce intermediate states of bending as depicted in the table of FIG. 5. A bent state of flexor 1, element 332, for an applied voltage of y volts (where y may equal 0.8 volts) and a bent state of flexor 2, element 334, for an applied voltage of x volts (where x may equal 0.6 volts) is depicted in the lower portion of FIG. 3B. When properly combined in a haptic user interface such as the glove 330, a three-dimensional haptic representation of the portion of the image 310 being grasped by a hand in FIG. 3A is provided to a user through the exertion of forces on a hand that simulate the resistance provided by the object represented in the two-dimensional image. The values provided herein are to facilitate discussion only and may vary depending on the circumstances.

Figure 4:
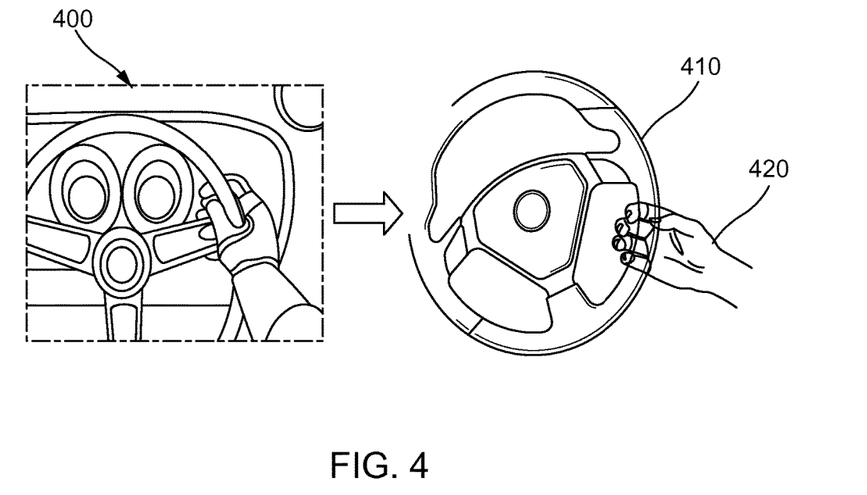
FIG. 4 is an example of a visual image in a game involving a haptic user interface according to an embodiment.
Figure 7:
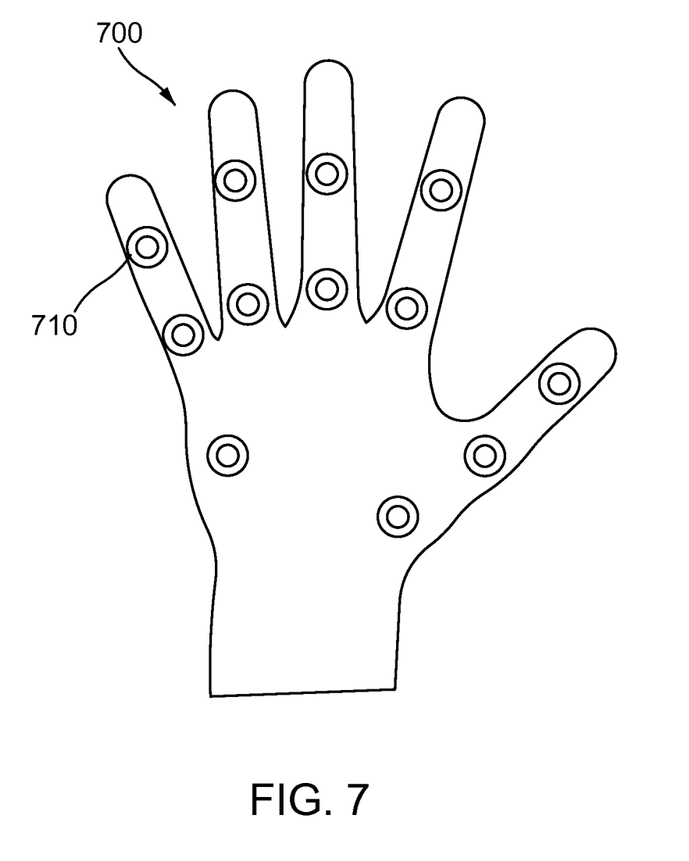
FIG. 7 is a haptic user interface glove depicting sensor locations according to an embodiment.

FIG. 4 depicts an example of a visual game image 400 (e.g., driving game image) according to an embodiment. In the illustrated example, a steering wheel 410 and a hand 420 in the visual game image 400 are isolated for use in a haptic user interface, as discussed in greater detail below. A user may observe the visual game image 400 containing the steering wheel 410 and desire to feel a portion of the steering wheel 410 held by the hand 420. Although the example presented is a driving game, it is noted that various interactive games and puzzles may use the haptic user interface control described in the embodiments. For example, a user may manipulate a RUBIK'S CUBE puzzle (Trademark, Rubik's Brand Ltd.) with a haptic user interface glove in order to virtually feel the cube while manipulating the cube using a virtual hand displayed in a two-dimensional image through placement of inertial sensors in the haptic user interface. FIG. 7 depicts a haptic user interface glove 700 with inertial sensors 710 that may provide feedback to the logic described above in order to manipulate a two-dimensional RUBIK'S CUBE image. In one aspect, inertial sensors 710 assess the position of a hand in the glove and correlate it to a current position of a hand relative to the cube in the game. In this manner, the user may virtually feel the cube and also be able to interactively manipulate the cube in order to solve the puzzle. The haptic user interface glove 700 may also be used in the visual game image 400 of FIG. 4.

Figure 6:
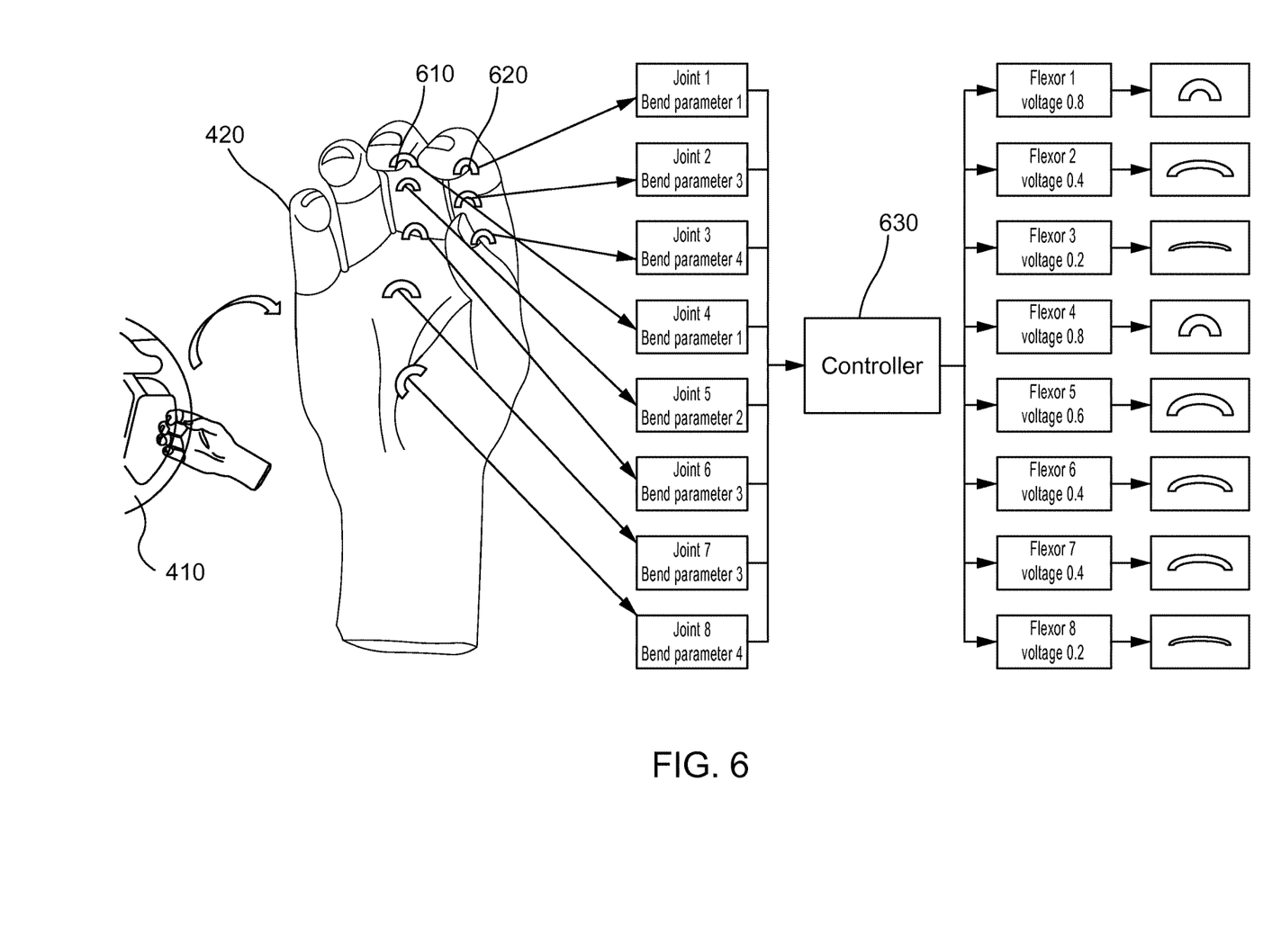
FIG. 6 is a plot of an example of shapes of an electroactive polymer material at different hand positions according to an embodiment.

FIG. 6 depicts the hand 420 of FIG. 4 with finger joints 610, 620 in various states of flexure as the hand grips a steering wheel 410. The various states of flexure of the hand 420 may be translated into states of flexure by controller 630 for segments of a haptic user interface glove such as the glove 330 of FIG. 3 or the glove 700 of FIG. 7. For example, the joint 620 is determined to be flexed at a level corresponding to a parameter denominated as "1". This level is translated by the controller as a position of flexor 1 and a voltage to be applied of 0.8 to create a large bending force. The joint 610 is also determined to have a voltage of 0.8 to be applied to create a large bending force. Note that the applied voltage may also take into account the size of each flexing portion such that a voltage applied to a small flexing portion produces a larger bending force than the same voltage applied to a larger flexing portion. When using a haptic user interface glove with inertial sensors, such as the glove of FIG. 7, the user may reposition the image of the hand 420 on the image of the steering wheel 410 (FIG. 4). At that time the controller will recalculate the forces that the haptic user interface glove should exert on the user's hand for the user to experience a three-dimensional haptic representation of the portion of the image of the steering wheel 410 being gripped by the image of the hand 420.

Additional Notes and Examples:

Example 1 may include an image conversion system including a haptic user interface, logic, implemented at least partly in one or more of configurable or fixed-functionality hardware, to generate a three dimensional model based on a two-dimensional image, determine one or more material characteristics of the haptic user interface, and trigger a change in the one or more material characteristics to create a three-dimensional haptic representation of at least a portion of the two-dimensional image.

Example 2 may include the system of example 1, wherein the hardware includes one or more of a processor or a digital to analog controller.

Example 3 may include the system of example 1, wherein the haptic user interface is a wearable device.

Example 4 may include the system of example 3, wherein the wearable device includes feedback sensors to control at least a portion of the two-dimensional image.

Example 5 may include the system of example 1, wherein the material includes one or more materials selected from electroactive polymers, ionic polymer-metal composites, piezoelectric materials, microfluidic materials, or electrostatic materials.

Example 6 may include the system of any one of examples 1 to 6, wherein the logic is to apply an electrical signal to the material to trigger the change.

Example 7 may include a haptic user interface management apparatus including logic, implemented at least partly in one or more of configurable or fixed-functionality hardware, to generate a three dimensional model based on a two-dimensional image, determine one or more material characteristics of the haptic user interface, and trigger a change in the one or more material characteristics to create a three-dimensional haptic representation of at least a portion of the two-dimensional image.

Example 8 may include the apparatus of example 7, wherein the hardware includes a processor.

Example 9 may include the apparatus of example 8, wherein the hardware includes a digital to analog controller.

Example 10 may include the apparatus of example 7, wherein the material characteristics are to include material dimensions.

Example 11 may include the apparatus of example 7, wherein the material is to include one or more materials selected from electroactive polymers, ionic polymer-metal composites, piezoelectric materials, microfluidic materials, or electrostatic materials.

Example 12 may include the apparatus of any one of examples 7 to 11, wherein the logic is to apply an electrical signal to the material to trigger the change.

Example 13 may include a method of managing a haptic user interface, including generating a three dimensional model based on a two-dimensional image, determining one or more material characteristics of a haptic user interface, and triggering a change in the one or more material characteristics to create a three-dimensional haptic representation of at least a portion of the two-dimensional image.

Example 14 may include the method of example 13, wherein the material characteristics of the haptic user interface are changed by a change in an electrical signal applied to the material.

Example 15 may include the method of example 13, wherein the material includes one or more materials selected from electroactive polymers, ionic polymer-metal composites, piezoelectric materials, microfluidic materials, or electrostatic materials.

Example 16 may include the method of example 13, wherein determining one or more material characteristics of the haptic user interface comprises determining a degree of rigidity or flexure to be applied to different segments of the haptic user interface.

Example 17 may include the method of example 16, wherein triggering a change in the one or more material characteristics comprises outputting electrical signals to create the degree of rigidity or curvature to be applied to the different segments of the haptic user interface.

Example 18 may include the method of any one of examples 13 to 17, further including sensing user feedback from the haptic user interface to change at least a portion of the two-dimensional image.

Example 19 may include at least one computer readable storage medium for managing a haptic user interface comprising a set of instructions which, when executed by a computing device, cause the computing device to generate a three dimensional model based on a two-dimensional image, determine one or more material characteristics of a haptic user interface, and trigger a change in the one or more material characteristics to create a three-dimensional haptic representation of at least a portion of the two-dimensional image.

Example 20 may include the at least one computer readable storage medium of example 19, wherein the instructions, when executed, cause the computing device to control a change in an applied electrical signal to the haptic user interface.

Example 21 may include the at least one computer readable storage medium of example 19, wherein the instructions, when executed, cause the computing device to determine a degree of rigidity or flexure to be applied to different segments of the haptic user interface.

Example 22 may include the at least one computer readable storage medium of example 19, wherein the instructions, when executed, cause the computing device to sense user feedback at the haptic user interface.

Example 23 may include the at least one computer readable storage medium of example 22, wherein the instructions, when executed, cause the computing device to change at least a portion of the two-dimensional image based on the sensed user feedback from the haptic user interface.

Example 24 may include the at least one computer readable storage medium of any one of examples 19 to 23, wherein the instructions, when executed, cause the computing device to calculate a voltage or current to be applied to a segment of the haptic user interface.

Example 25 may include a haptic user interface management apparatus including means for generating a three dimensional model based on a two-dimensional image, means for determining one or more material characteristics of a haptic user interface, and means for triggering a change in the one or more material characteristics to create a three-dimensional haptic representation of at least a portion of the two-dimensional image.

Example 26 may include the haptic user interface management apparatus of example 25, wherein change is triggered by changing an electrical signal applied to the material.

Example 27 may include the haptic user interface management apparatus of example 25, wherein the material includes one or more materials selected from electroactive polymers, ionic polymer-metal composites, piezoelectric materials, microfluidic materials, or electrostatic materials.

Example 28 may include the haptic user interface management apparatus of example 25, wherein the haptic user interface is a wearable device.

Example 29 may include the haptic user interface management apparatus of example 25, wherein the wearable device includes one or more sensors to sense user feedback.

Example 30 may include the haptic user interface management apparatus of any one of examples 25 to 29, further comprising means for sensing user feedback from the haptic user interface to change at least a portion of the two-dimensional image.

Example 31 may include a haptic user interface system including a processor to translate a two-dimensional image to a three-dimensional model of the two-dimensional image and to determine haptic user interface material characteristics corresponding to the three-dimensional model, a controller to receive the determined haptic user interface material characteristics and output electrical signals to create the material characteristics corresponding to the three-dimensional model, and a haptic user interface to receive the output electrical signals from the controller and change material characteristics in accordance with the electrical signals to create a three-dimensional haptic representation of the two-dimensional image.

Example 32 may include the haptic user interface system of example 31, wherein the controller is a digital to analog controller.

Example 33 may include the haptic user interface system of example 31, wherein the haptic user interface is a wearable device.

Example 34 may include the haptic user interface system of example 33, wherein the wearable device includes feedback sensors to control at least a portion of the two-dimensional image.

Example 35 may include the haptic user interface system of any one of examples 31 to 34, wherein the haptic user interface material includes one or more materials selected from electroactive polymers, ionic polymer-metal composites, piezoelectric materials, microfluidic materials, or electrostatic materials.

Thus, embodiments described above may facilitate manipulation of objects by correlating touch and vision. A user can also realistically experience the feeling of the object being viewed. For example, a user can see a hand interacting with an object and change the position of the hand while being able to realistically experience the resistance of the object through the haptic user interface. This may be used in various virtual environments including augmented reality. By creating a three-dimensional model from a two-dimensional image, any two-dimensional object surface can be realistically presented by the haptic user interface. There are numerous applications of the embodiments described above. For example, simulators such as surgery simulators and flight simulators could provide realistic haptic feedback to the simulator user. Robotic interfaces for surgery and toxic waste manipulation may provide the user with the feel of the object with which he/she is interacting. Haptic user interfaces could be used to interact with displays such as in the context of a "virtual mouse" when provided with feedback sensors.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
   a processor with a three-dimensional model generator to generate a three-dimensional model based on a two-dimensional image;
   a haptic user interface including an electroactive material; and
   a digital to analog controller to generate an electrical signal to trigger a change in one or more material characteristics of the electroactive material of the haptic user interface to create a three-dimensional haptic representation in the haptic user interface of at least a portion of the two-dimensional image, wherein the electrical signal is to create a degree of rigidity or curvature to be applied to different segments of the haptic user interface, and wherein intermediate voltages are to produce intermediate states of bending, the different segments including a smaller segment and a larger segment, wherein the smaller segment is smaller than the larger segment, and wherein the electrical signal is to produce a greater bending force when applied to the smaller segment than when applied to the larger segment.

2. The system of claim 1, wherein the haptic user interface is a wearable device.

3. The system of claim 2, wherein the wearable device includes feedback sensors to control at least a portion of the two-dimensional image.

4. The system of claim 1, wherein the electroactive material includes one or more materials selected from ionic polymer-metal composites, or electrostatic materials.

5. An apparatus comprising:
   a processor with a three-dimensional model generator to generate a three-dimensional model based on a two-dimensional image; and
   a digital to analog controller to generate an electrical signal to trigger a change in one or more material characteristics of an electroactive material within a haptic user interface to create a three-dimensional haptic representation of at least a portion of the two-dimensional image, wherein the electrical signal is to create a degree of rigidity or curvature to be applied to different segments of the haptic user interface, and wherein intermediate voltages are to produce intermediate states of bending, the different segments including a smaller segment and a larger segment, the smaller segment being smaller than the larger segment, wherein the electrical signal is to produce a greater bending force when applied to the smaller segment than when applied to the larger segment.

6. The apparatus of claim 5, wherein the electroactive material characteristics are to include material dimensions that change in response to an external stimulus or trigger, or are actuated by an external stimulus including microfluidic actuators.

7. The apparatus of claim 5, wherein the electroactive material is to include one or more materials selected from ionic polymer-metal composites, or electrostatic materials.

8. A method comprising:
   generating a three-dimensional model based on a two-dimensional image;
   determining one or more material characteristics of a haptic user interface wherein determining one or more material characteristics of the haptic user interface comprises determining a degree of rigidity or flexure to be applied to different segments of an electroactive material of the haptic user interface; and
   triggering a change in the one or more material characteristics to create a three-dimensional haptic representation of at least a portion of the two-dimensional image wherein triggering a change in the one or more material characteristics comprises outputting electrical signals to create the degree of rigidity or curvature to be applied to the different segments of the haptic user interface, wherein intermediate voltages produce intermediate states of bending, the different segments including a smaller segment and a larger segment, the smaller segment smaller than the larger segment, wherein the electrical signals produce a greater bending force when applied to the smaller segment than when applied to the larger segment.

9. The method of claim 8, wherein the electroactive material includes one or more materials selected from ionic polymer-metal composites, or electrostatic materials.

10. The method of claim 8, further comprising sensing user feedback at the haptic user interface to change at least a portion of the two-dimensional image.

11. At least one non-transitory computer readable storage medium comprising a set of instructions which, when executed by a computing device, cause the computing device to
    generate a three-dimensional model based on a two-dimensional image;
    determine one or more material characteristics of a haptic user interface wherein determining one or more material characteristics of the haptic user interface comprises determining a degree of rigidity or flexure to be applied to an electroactive material in different segments of the haptic user interface; and
    trigger a change in the one or more material characteristics to create a three-dimensional haptic representation of at least a portion of the two-dimensional image wherein triggering a change in the one or more material characteristics comprises causing electrical signals to be output to create the degree of rigidity or curvature to be applied to the different segments of the haptic user interface, wherein intermediate voltages are to produce intermediate states of bending, the different segments including a smaller segment and a larger segment, wherein the smaller segment is smaller than the larger segment, wherein the electrical signals are to produce a greater bending force when applied to the smaller segment than when applied to the larger segment.

12. The at least one non-transitory computer readable storage medium of claim 11, wherein the instructions, when executed, cause the computing device to sense user feedback at the haptic user interface.

13. The at least one non-transitory computer readable storage medium of claim 12, wherein the instructions, when executed, cause the computing device to change at least a portion of the two-dimensional image based on the sensed user feedback from the haptic user interface.

* * * * *